No. 717,378. Patented Dec. 30, 1902.
E. FOURCAULT.
APPARATUS FOR THE MANUFACTURE OF PLATE GLASS BY STRETCHING.
(Application filed May 24, 1902.)
(No Model.) 2 Sheets—Sheet 1.
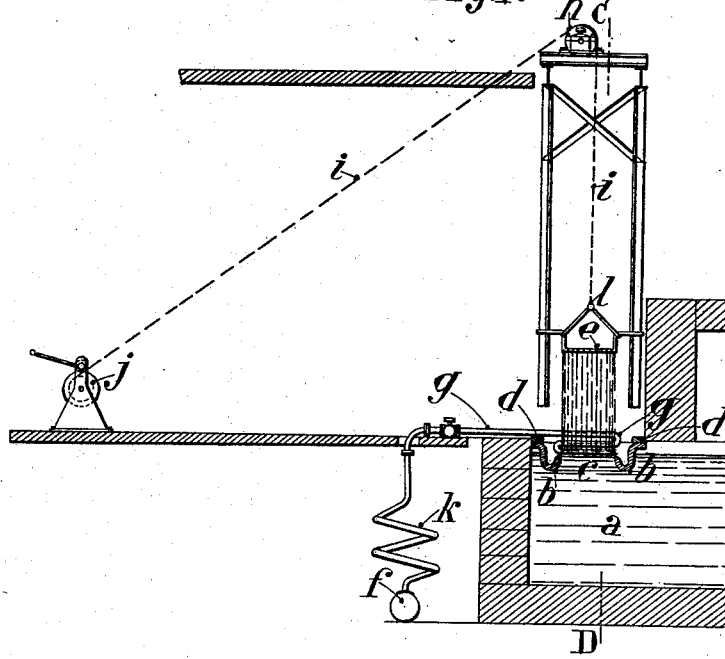
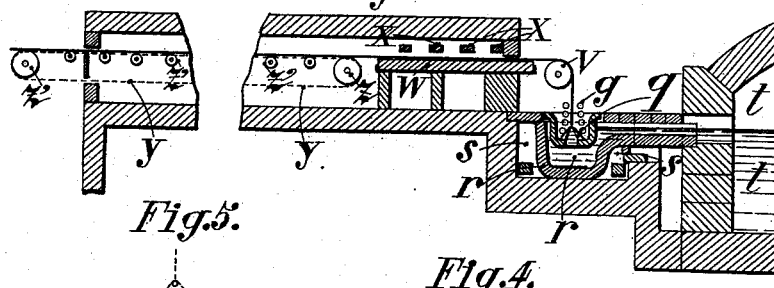
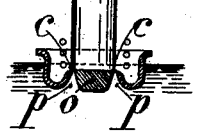
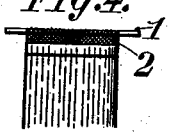
Witnesses:
Philip N. Tilden
C. L. Kesler
Inventor
Emile Fourcault
By James L. Norris
Atty.

No. 717,378. Patented Dec. 30, 1902.
E. FOURCAULT.
APPARATUS FOR THE MANUFACTURE OF PLATE GLASS BY STRETCHING.
(Application filed May 24, 1902.)

(No Model.) 2 Sheets—Sheet 2.

Witnesses:
Philip N. Tilden
C. D. Kesler

Inventor
Emile Fourcault
By
James L. Norris
Atty.

UNITED STATES PATENT OFFICE.

EMILE FOURCAULT, OF DAMPREMY, NEAR CHARLEROI, BELGIUM.

APPARATUS FOR THE MANUFACTURE OF PLATE-GLASS BY STRETCHING.

SPECIFICATION forming part of Letters Patent No. 717,378, dated December 30, 1902.

Application filed May 24, 1902. Serial No. 108,826. (No model.)

*To all whom it may concern:*

Be it known that I, EMILE FOURCAULT, a citizen of the Kingdom of Belgium, residing at Dampremy, near Charleroi, Belgium, have invented certain new and useful Improvements in Apparatus for the Manufacture of Plate-Glass by Stretching, of which the following is a specification.

This invention relates to apparatus for the manufacture of plate-glass, and has for its object to provide a new apparatus of this kind for manufacturing glass plates, sheets, or cylinders by drawing or stretching molten glass through a slotted float or former of novel construction.

The details of construction and the mode of operation of my improved apparatus will be understood from the following description, and the novel features thereof will be pointed out in the claims following said description.

In order that the description of the invention may be more readily understood, reference is had to the accompanying drawings, forming a part of this specification, in which—

Figure 2:
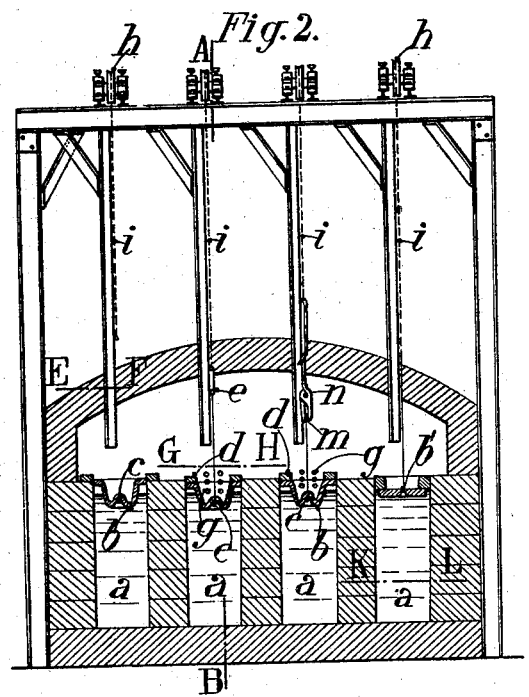
Figure 3:
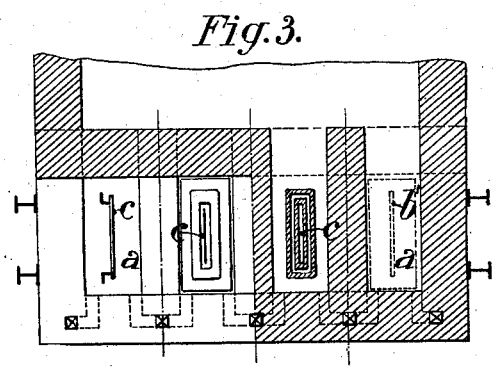

Figure 1 is a longitudinal section of my improved apparatus, taken on the line A B of Fig. 2. Fig. 2 is a cross-section through the line C D of Fig. 1. Fig. 3 is a section through line E F, G, H, I, J and K, L of Fig. 2. Fig. 4 shows in detail the gripping device for the molten glass in the case where plane sheets are to be obtained. Fig. 5 shows suitable form of gripping device for the manufacture of glass cylinders. Fig. 6 is a longitudinal section of an apparatus according to this invention arranged for manufacturing plates of an indefinite length.

Referring to Figs. 1, 2, 3, the glass is contained in an ordinary glass-tank, divided into a number of small compartments $a$, the said compartments being arranged in front of the furnace. On the surface of the glass in each of the compartments $a$ floats a piece $b$ of refractory material, that will hereinafter be referred to as the "float" or "former." The said float or former is shaped according to the cross-section of the compartment $a$ in which it is placed, and its bottom, which curves upward, as shown, is provided with a longitudinal slot $c$ of any suitable width and of a length equal to the width of the sheet or plate to be obtained. By reason of the upwardly-curved bottom of the former or float $b$ when said float or former rests upon the surface of the molten glass the slot $c$ therein is located a slight distance above said surface. In this manner when the said float or former is slightly sunk into the liquid mass, either by pressure or by the load of firebricks $d$ applied thereon, the longitudinal slot comes below the level of the glass and allows the escape of a quantity of semi-liquid glass through the slot $c$ having a width and length equal to the width and length of the said slot. Before the float is thrust down an iron frame $e$ is placed upon or inserted into the slot $c$, to which frame the liquid glass adheres as soon as it is forced upward through the slot by the sinking of said float or former. If now a slow ascending movement is given to the frame $e$, the liquid glass is drawn through the slot and forms a plate of glass, which does not break from the main mass owing to its great viscosity. In order that the formation of the plate or sheet may occur in a continuous manner, the upward movement of the iron frame must be slow enough to allow the part which has been drawn through the slot to cool and harden sufficiently for continuously extracting a fresh quantity of molten glass. For the purpose of accelerating the cooling of the glass sheet while it is being drawn upward an air-blast taken from a main air-pipe $f$, Fig. 1, is led along each side of the glass plate being produced by means of air-pipes $g$, provided with a great number of small apertures. The air-blast may be controlled by means of a cock on the pipe $g$, and a flexible pipe $k$ between the main air-duct $f$ and the pipe $g$ allows said pipe $g$ to be readily removed from its position in proximity to the slot $c$ in the float or former when it is desired to remove said float or former from the surface of the glass in the tank. For regulating the size or length of the glass plate it is necessary to suitably control the sinking of the float, the strength of the air-blast, and the speed of the upward movement of the frame. As a greater quantity of molten glass will be forced upward through the slot in the float or former the greater the extent to which said float or former is sunk in the mass of molten glass, the output of the apparatus and the rapidity of its operation can be controlled by simply regulating the extent to which the float or former is sunk in the mass of molten glass. The ascending movement of the frame is obtained by means of a rope $i$, which has one of its ends secured at $l$ to the said frame and then passes over a grooved pulley $h$ and has its other end secured to a winch $j$. The speed of the rope $i$ must always exceed the speed of the flow of the molten glass through the slot $c$ in order to prevent the glass from flowing onto the top surface of the float or former on either side of the said slot. The greater the difference between the speed of the rope $i$ and that of the glass as it rises through the slot $c$ the thinner is the sheet or plate obtained, and as this difference may be regulated at will the thickness of the glass plate can be easily controlled, and if the speed of the rope is kept uniform during the formation of the plate said plate will have an equal thickness throughout its length. The uniformity of this speed may be obtained by any suitable mechanical device, such as an electric motor operating the winch $j$. The width of the plate is also kept the same as long as the movement of the frame is kept uniform. When it is desired to stop the formation of the glass plate, the air-blast is cut off, the speed of the rope $i$ is increased, and the loads on the float $b$ are removed. The glass plate also could be detached from the float by cutting it with suitable shears close above the slot $c$. The glass plate thus obtained is carried, along with its frame $e$, into an annealing-furnace by any suitable means, where it is annealed and cooled according to the usual methods. The frame $e$ is passed into the annealing-furnace, together with the plate, from which plate it is afterward cut off by means of a diamond or otherwise.

According to a modification of my invention the frame $e$, as shown in Fig. 4, consists of an iron bar 1 of circular cross-section, to which is secured a metallic web 2, to which web the molten glass adheres when said web is brought into contact with the molten glass; but care must be taken to dip only a part of the web in the glass in order to prevent the sheet of glass breaking while cooling, particularly when the diameter of the iron bar is a very large one.

Instead of a frame, such as $e$, pincers $n$ may be provided for clamping the glass plate between their grooved jaws $m$, as shown in Fig. 2, said pincers having a length equal to the width of the glass plate, and as the glass is clamped between the jaws while in a plastic condition the glass enters the grooves of the jaws, where it firmly adheres. When the glass plate is to be freed, the pincers $n$ are opened. In the same Fig. 2 a more simple form of float is shown, which consists of a firebrick or flagstone $b$, having in its middle part a slot through which the glass sheets are to be drawn.

When glass cylinders are to be obtained, the float or former is constructed as illustrated by Fig. 5. The slot $c$ in this construction is circular, and the central core $o$ is connected with the body of the float by any suitable means.

Fig. 6 is a longitudinal section of an apparatus according to this invention arranged so as to produce sheets of an indefinite length.

The raised portions $q$ at the bottom of the float, surrounding the slot, may be metal, the employment of a float of refractory material being unnecessary, because this part of the apparatus is not directly within the furnace.

The float or former rests on the molten glass contained in a pot $r$, which pot is set in a small furnace $s$, provided with an independent heating arrangement and continually supplied with molten glass from a furnace $t$. The glass-level in the pot is maintained constant, and the fluidity of the glass may be regulated by the heat applied to the pot $t$. The sheet of glass after being stretched is brought over a metallic roller $v$. The roller being very near the float, the sheet of glass as it comes into contact therewith is yet plastic enough to bend on the roller $v$ and to become straight when laid on the refractory dead-plate $w$. This dead-plate is placed at the entrance of a continuous annealing-furnace at the rear of the roller. Any suitable heating means, as the pipes $x$, are provided above the dead-plate $w$, by which the glass sheet is reheated for the purpose of planing. The sheet then slowly cools on a metallic conveyer $y$, traveling on rollers $z\ z'$, rotated at uniform speed. In order to avoid streaks on the glass plates, which may occur in passing over the refractory stone $w$, an asbestos sheet may be placed on the stone. The glass plates when coming out from the apparatus are entirely finished and perfect. As only a certain quantity of glass can pass through the slot $c$ in the float or former $b$ at one time, there is a stretching or drawing action between the float or former below and the frame $e$ or clamp $n$ above, due to the tendency of the frame or clamp to draw upward a larger quantity of molten glass than the slot in the float or former will allow to pass. In this way the plate of glass which is being produced may be stretched or drawn to any desired thickness.

Having now described my invention, what I claim is—

1. In an apparatus for manufacturing plate-glass by stretching, a tank for containing glass in a molten condition, means for drawing glass from said tank, means for cooling the glass as it is drawn upward, a float or former in said tank, a slot in said float or former, and means for forcing said float or former into the molten glass contained in said tank, for the purposes specified.

2. In an apparatus for manufacturing plate-glass by stretching, a tank for containing glass in a molten condition, a float or former having an upwardly-curved bottom located in said tank, a slot in the upwardly-curved bottom of said former, means for drawing glass through said slot, and means for cooling the glass as it is drawn through said slot.

3. In an apparatus for manufacturing plate-glass by stretching, a tank for containing glass in a molten condition, a float or former having an upwardly-curved bottom located in said tank, a slot in the upwardly-curved bottom of said former, means for forcing said former into the molten glass contained in said tank, means for drawing glass through said slot, and means for cooling the glass as it is drawn through said slot.

4. In an apparatus for manufacturing plate-glass by stretching, a series of compartments for containing molten glass, a float or former, having an upwardly-curved bottom, located in each of said compartments, a slot in the upwardly-curved bottom of each of said formers, means for forcing each of said formers into the molten glass contained in said compartments, means for drawing glass through the slot in each of said formers, and means in each of said compartments for cooling the glass as it is drawn through said slot, substantially as described and for the purpose specified.

In testimony whereof I have hereunto set my hand in presence of two subscribing witnesses.

EMILE FOURCAULT.

Witnesses:
E. DAVIES,
J. DONAH.